United States Patent
Khmelnitsky et al.

(10) Patent No.: US 9,841,917 B2
(45) Date of Patent: Dec. 12, 2017

(54) SYSTEMS AND METHODS FOR CONFIGURING NON-VOLATILE MEMORY

(71) Applicant: Apple Inc., Cupertino, CA (US)

(72) Inventors: Vadim Khmelnitsky, Foster City, CA (US); Daniel J. Post, Pacifica, CA (US); Nir Jacob Wakrat, Los Altos, CA (US); Matthew J. Byom, San Jose, CA (US); Kenneth L. Herman, San Jose, CA (US); Alexander C. Sanks, Menlo Park, CA (US)

(73) Assignee: APPLE INC., Cupertino, CA (US)

(*) Notice: Subject to any disclaimer, the term of this patent is extended or adjusted under 35 U.S.C. 154(b) by 57 days.

(21) Appl. No.: 14/962,339

(22) Filed: Dec. 8, 2015

(65) Prior Publication Data

US 2016/0092110 A1   Mar. 31, 2016

Related U.S. Application Data

(62) Division of application No. 13/235,019, filed on Sep. 16, 2011, now Pat. No. 9,235,502.

(51) Int. Cl.
*G06F 12/02* (2006.01)
*G06F 3/06* (2006.01)

(52) U.S. Cl.
CPC ............ *G06F 3/064* (2013.01); *G06F 3/0604* (2013.01); *G06F 3/0685* (2013.01); *G06F 12/0246* (2013.01); *G06F 2212/7201* (2013.01); *G06F 2212/7206* (2013.01)

(58) Field of Classification Search
CPC ...... G06F 3/0604; G06F 3/064; G06F 3/0644; G06F 3/0679; G06F 3/0685; G06F 12/0246; G06F 12/0615; G06F 2212/7201; G06F 2212/7206
USPC .................... 711/103, 112, 209, 221
See application file for complete search history.

(56) References Cited

U.S. PATENT DOCUMENTS

| | | | |
|---|---|---|---|
| 7,085,879 B2 * | 8/2006 | Aasheim | G06F 12/0246 707/999.103 |
| 7,443,770 B2 | 10/2008 | Kato | |
| 8,521,948 B2 | 8/2013 | Post et al. | |
| 8,738,882 B2 | 5/2014 | Post et al. | |
| 2003/0097520 A1 | 5/2003 | Lai et al. | |
| 2004/0246824 A1 | 12/2004 | Wu et al. | |

(Continued)

FOREIGN PATENT DOCUMENTS

| | | |
|---|---|---|
| EP | 2282266 | 2/2011 |
| EP | 2282267 | 2/2011 |
| WO | 2009/100031 | 8/2009 |

*Primary Examiner* — Gary Portka
(74) *Attorney, Agent, or Firm* — Van Court & Aldridge LLP

(57) ABSTRACT

Systems and methods are disclosed for configuring a non-volatile memory ("NVM"). In some embodiments, each block of the NVM can include a block table-of-contents ("TOC"), which can be encoded (e.g., run-length encoded) and dynamically-sized. Thus, as user data is being programmed to a block, the size of a block TOC can be concurrently recalculated and increased only if necessary. In some embodiments, the NVM interface can use a weave sequence stored in the context information and at least one weave sequence associated with each page of a block to determine whether to replay across the pages of the block after system boot-up.

20 Claims, 8 Drawing Sheets

(56) References Cited

U.S. PATENT DOCUMENTS

2007/0011445 A1 1/2007 Waltermann et al.
2007/0124531 A1 5/2007 Nishihara
2008/0195802 A1 8/2008 Lee et al.
2012/0221767 A1 8/2012 Post et al.
2013/0311709 A1* 11/2013 Im ........................ G06F 12/0246
　　　　　　　　　　　　　　　　　　　　　　　711/103

* cited by examiner

SYSTEMS AND METHODS FOR CONFIGURING NON-VOLATILE MEMORY

This application is a divisional of U.S. patent application Ser. No. 13/235,019 filed Sep. 16, 2011, the content of which is hereby incorporated by reference.

BACKGROUND OF THE DISCLOSURE

NAND flash memory, as well as other types of non-volatile memories ("NVMs"), are commonly used for mass storage. For example, consumer electronics such as portable media players often include flash memory to store music, videos, and other media.

Typically, each page of a NVM can be used to store a single logical block address ("LBA"). However, when the system needs to access smaller pieces of data (e.g., a portion of a page), an entire page has to be accessed. For example, during a read operation, the system may need to read an entire page and discard the unwanted data.

SUMMARY OF THE DISCLOSURE

Systems and methods are disclosed for configuring non-volatile memory ("NVM"). In particular, multiple logical addresses can be stored in each page of the NVM. Each page of the NVM may also be associated with at least one weave sequence. A weave sequence can indicate when data was last programmed to a logical address. In addition, one or more blocks of the NVM can be used to store context information. As used herein, "context information" can refer to information associated with the state of the NVM at a particular point in time.

In some embodiments, each block of the NVM can include a block table-of-contents ("TOC"), which can be a journal that includes information mapping the data pages of a block to corresponding logical addresses. The block TOC can be encoded (e.g., run-length encoded) and dynamically-sized. Thus, as user data is being programmed to a block, the size of a block TOC can be concurrently recalculated and increased only if necessary. In some embodiments, the NVM interface can use a weave sequence stored in the context information and at least one weave sequence associated with each page of a super block to determine whether to replay across the pages of the super block after system boot-up.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which.

DETAILED DESCRIPTION OF THE DISCLOSURE

Systems and methods for configuring a non-volatile memory ("NVM") are provided. In particular, multiple logical addresses can be stored in each page of the NVM. Each page of the NVM may also be associated with at least one weave sequence. A weave sequence can indicate when data was last programmed to a logical address. In addition, one or more blocks of the NVM can be used to store context information. As used herein, "context information" can refer to information associated with the state of the NVM at a particular point in time.

In some embodiments, each block of the NVM can include a block table-of-contents ("TOC"), which can be a journal that includes information mapping the data pages of a block to corresponding logical addresses. The block TOC can be encoded (e.g., run-length encoded) and dynamically-sized. Thus, as user data associated with one or more write commands are being programmed to a block, the size of a block TOC can be concurrently recalculated and increased only if necessary. The rate at which a block TOC increases in size can be dependent on one or more characteristics of the NVM and the write commands such as, for example, the size of the one or more write commands, the order (e.g., sequentiality) of logical addresses of the one or more write commands, the compressibility of the user data, the geometry of a particular block, and/or any combination thereof.

In some embodiments, the NVM interface can use a weave sequence stored in the context information and at least one weave sequence associated with each page of a block NVM to determine whether to replay across the pages of the block after system boot-up. By replaying across a page, the NVM interface can obtain logical-to-physical mapping updates from the page.

Figure 1:
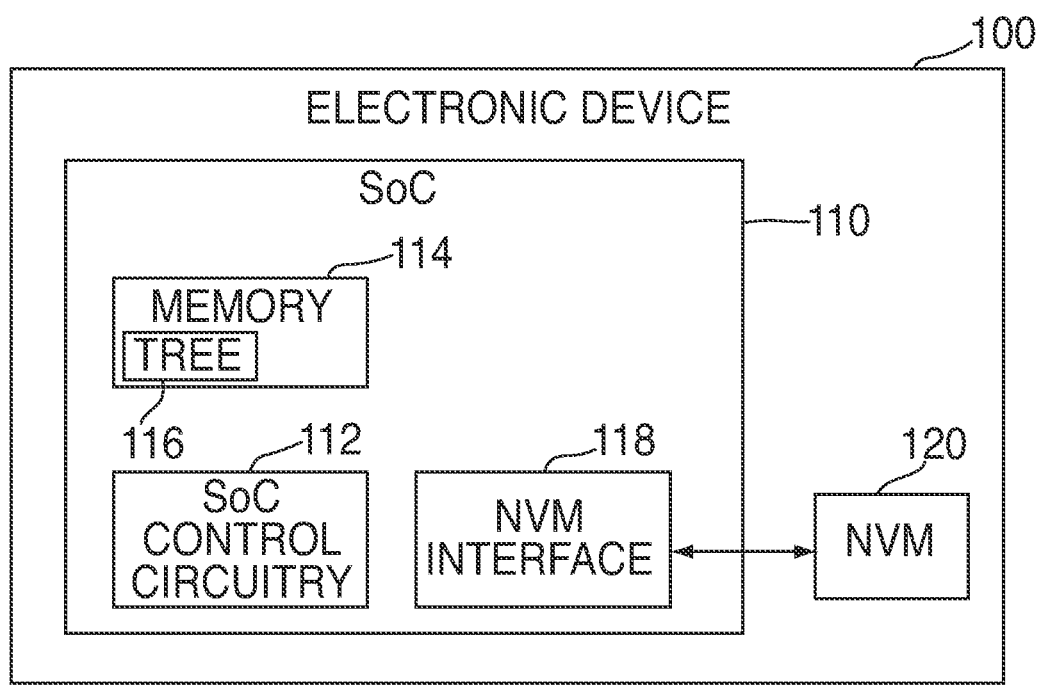
FIGS. 1 and 2 are block diagrams of electronic devices configured in accordance with various embodiments of the invention.

FIG. 1 illustrates a block diagram of electronic device 100. In some embodiments, electronic device 100 can be or can include a portable media player, a cellular telephone, a pocket-sized personal computer, a personal digital assistance ("PDA"), a desktop computer, a laptop computer, and any other suitable type of electronic device.

Electronic device 100 can include system-on-a-chip ("SoC") 110 and non-volatile memory ("NVM") 120. Non-volatile memory 120 can include a NAND flash memory based on floating gate or charge trapping technology, NOR flash memory, erasable programmable read only memory ("EPROM"), electrically erasable programmable read only memory ("EEPROM"), Ferroelectric RAM ("FRAM"), magnetoresistive RAM ("MRAM"), or any combination thereof.

NVM 120 can be organized into "blocks", which can the smallest erasable unit, and further organized into "pages", which can be the smallest unit that can be programmed or read. In some embodiments, NVM 120 can include multiple integrated circuits, where each integrated circuit may have multiple blocks. Memory locations (e.g., blocks or pages of blocks) from corresponding integrated circuits may form "super blocks". Each memory location (e.g., page or block)

of NVM 120 can be referenced using a physical address (e.g., a physical page address, physical block address, or virtual block address).

System-on-a-chip 110 can include SoC control circuitry 112, memory 114, and NVM interface 118. SoC control circuitry 112 can control the general operations and functions of SoC 110 and the other components of SoC 110 or device 100. For example, responsive to user inputs and/or the instructions of an application or operating system, SoC control circuitry 112 can issue read or write commands to NVM interface 118 to obtain data from or store data in NVM 120. For clarity, data that SoC control circuitry 112 may request for storage or retrieval may be referred to as "user data," even though the data may not be directly associated with a user or user application. Rather, the user data can be any suitable sequence of digital information generated or obtained by SoC control circuitry 112 (e.g., via an application or operating system).

SoC control circuitry 112 can include any combination of hardware, software, and firmware, and any components, circuitry, or logic operative to drive the functionality of electronic device 100. For example, SoC control circuitry 112 can include one or more processors that operate under the control of software/firmware stored in NVM 120 or memory 114.

Memory 114 can include any suitable type of volatile memory, such as random access memory ("RAM") (e.g., static RAM ("SRAM"), dynamic random access memory ("DRAM"), synchronous dynamic random access memory ("SDRAM"), double-data-rate ("DDR") RAM), cache memory, read-only memory ("ROM"), or any combination thereof. Memory 114 can include a data source that can temporarily store user data for programming into or reading from non-volatile memory 120. In some embodiments, memory 114 may act as the main memory for any processors implemented as part of SoC control circuitry 112.

In some embodiments, memory 114 can store tree 116, which can provide logical-to-physical mappings between logical addresses used by a file system and physical addresses of NVM 120. In particular, tree 116 can provide a mapping between logical block addresses ("LBAs") and corresponding physical addresses (e.g., physical page addresses or virtual block addresses) of NVM 120.

NVM interface 118 may include any suitable combination of hardware, software, and/or firmware configured to act as an interface or driver between SoC control circuitry 112 and NVM 120. For any software modules included in NVM interface 118, corresponding program code may be stored in NVM 120 or memory 114.

NVM interface 118 can perform a variety of functions that allow SoC control circuitry 112 to access NVM 120 and to manage the memory locations (e.g., pages, blocks, super blocks, integrated circuits) of NVM 120 and the data stored therein (e.g., user data). For example, NVM interface 118 can interpret the read or write requests from SoC control circuitry 112, perform wear leveling, and generate read and program instructions compatible with the bus protocol of NVM 120.

While NVM interface 118 and SoC control circuitry 112 are shown as separate modules, this is intended only to simplify the description of the embodiments of the invention. It should be understood that these modules may share hardware components, software components, or both. For example, SoC control circuitry 112 may execute a software-based memory driver for NVM interface 118.

In some embodiments, electronic device 100 can include a target device, such as a flash memory drive or Secure Digital ("SD") card, that includes NVM 120 and some or all portions of NVM interface 118 (e.g., a translation layer, discussed below). In these embodiments, SoC 110 or SoC control circuitry 112 may act as the host controller for the target device. For example, as the host controller, SoC 110 can issue read and write requests to the target device.

Figure 2:
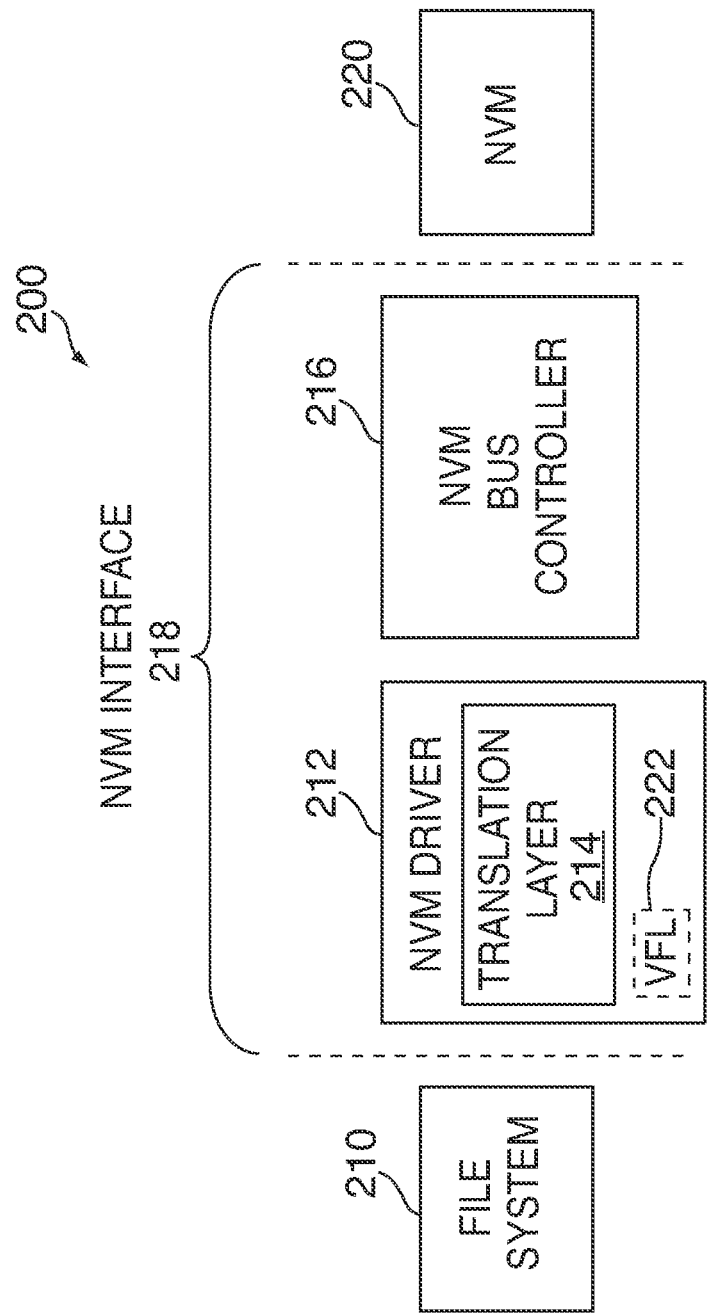

FIG. 2 illustrates a block diagram of electronic device 200, which may illustrate in greater detail some of the firmware, software, and/or hardware components of electronic device 100 (FIG. 1) in accordance with various embodiments. Electronic device 200 may have any of the features and functionalities described above in connection with FIG. 1, and vice versa. As shown, dashed lines demarcate the layers. It is understood that the depiction of which components fall within the demarcation lines are merely illustrative and that one or more components can be affiliated with a different layer.

Electronic device 200 can include file system 210, NVM driver 212, NVM bus controller 216, and NVM 220. In some embodiments, file system 210 and NVM driver 212 may be software or firmware modules, and NVM bus controller 216 and NVM 220 may be hardware modules. Accordingly, in these embodiments, NVM driver 212 may represent the software or firmware aspect of NVM interface 218, and NVM bus controller 216 may represent the hardware aspect of NVM interface 218.

File system 210 can include any suitable type of file system, such as a File Allocation Table ("FAT") file system or a Hierarchical File System Plus ("HFS+"), and may be part of the operating system of electronic device 200 (e.g., part of SoC control circuitry 112 of FIG. 1). In some embodiments, file system 210 may include a flash file system, which provides a logical-to-physical mapping of pages. In these embodiments, file system 210 may perform some or all of the functionalities of NVM driver 212 discussed below, and therefore file system 210 and NVM driver 212 may or may not be separate modules.

File system 210 may manage file and folder structures for the application and operating system. File system 210 may operate under the control of an application or operating system running on electronic device 200, and may provide write and read commands to NVM driver 212 when the application or operating system requests that information be read from or stored in NVM 220. Along with each read or write command, file system 210 can provide a logical address to indicate where the user data should be read from or written to, such as a logical page address or a logical block address ("LBA") with a page offset.

File system 210 may provide read and write requests to NVM driver 212 that are not directly compatible with NVM 220. For example, the logical addresses may use conventions or protocols typical of hard-drive-based systems. A hard-drive-based system, unlike flash memory, can overwrite a memory location without first performing a block erase. Moreover, hard drives may not need wear leveling to increase the lifespan of the device. Therefore, NVM interface 218 can perform any functions that are memory-specific, vendor-specific, or both to handle file system requests and perform other management functions in a manner suitable for NVM 220.

NVM driver 212 can include translation layer 214. In some embodiments, translation layer 214 may be or include a flash translation layer ("FTL"). On a write command, translation layer 214 can map the provided logical address to a free, erased physical location on NVM 220. On a read command, translation layer 214 can use the provided logical address to determine the physical address at which the requested data is stored. Because each NVM may have a different layout depending on the size or vendor of the NVM, this mapping operation may be memory and/or vendor-specific. Translation layer 214 can perform any other suitable functions in addition to logical-to-physical address mapping. For example, translation layer 214 can perform any of the other functions that may be typical of flash translation layers, such as garbage collection and wear leveling.

In some embodiments, NVM driver 212 can include virtual flash layer ("VFL") 222. VFL 222 is shown with a dashed-line box in FIG. 2 to indicate that its function can be implemented in different locations of device 200. As shown, VFL 222 is implemented as a part of NVM driver 212. In other embodiments, VFL 222 can be implemented in a different portion of NVM interface 218. In further embodiments, VFL 222 can be implemented in NVM 220.

VFL 222 can manage one or more physical elements of NVM 220 (e.g., bad blocks, stripes, and super blocks). For example, VFL 222 can perform bad block management. Conventionally, bad block management is accomplished by replacing a bad block in NVM 220 with a block from a set of blocks specifically allocated as bad block replacements. However, in a system that does not have bad block replacements (e.g., a system that does not have one or more blocks reserved for replacing bad blocks), block failures need to be handled differently. In such a configuration, when a particular block of NVM 220 is determined to be a bad block (e.g., one or more programming failures have been detected in the block), VFL 222 can mark the bad block for deletion. Then, during garbage collection, the valid data residing on the bad block can be moved to a different block, and the bad block can be erased. Consequently, the size of a super block to which the block was assigned can be decreased. Bad block management will be discussed in more detail in connection with FIG. 3.

NVM driver 212 may interface with NVM bus controller 216 to complete NVM access commands (e.g., program, read, and erase commands). Bus controller 216 may act as the hardware interface to NVM 220, and can communicate with NVM 220 using the bus protocol, data rate, and other specifications of NVM 220.

NVM interface 218 may manage NVM 220 based on memory management data, sometimes referred to herein as "metadata". The metadata may be generated by NVM driver 212 or may be generated by a module operating under the control of NVM driver 212. For example, metadata can include information used for managing the mapping between logical and physical addresses, information associated with bad block management, information associated with wear leveling, error-correcting code ("ECC") data used for detecting or correcting data errors, or any combination thereof. The metadata may include data provided by file system 210 along with the user data, such as a logical address. Thus, in general, "metadata" may refer to any information about or relating to user data or used generally to manage the operation and memory locations of a non-volatile memory.

NVM interface 218 may be configured to store metadata in NVM 220. In some embodiments, NVM interface 218 may store metadata associated with user data at the same memory location (e.g., page) in which the user data is stored. For example, NVM interface 218 may store user data, the associated logical address, and ECC data for the user data at one or more memory locations of NVM 220. NVM interface 218 may also store other types of metadata about the user data in the same memory location. Metadata that is stored along with user data will be discussed in more detail in connection with FIG. 4.

NVM interface 218 may store the logical address so that, on power-up of NVM 220 or during operation of NVM 220, electronic device 200 can determine what data resides at that location. In particular, because file system 210 may reference the user data according to its logical address and not its physical address, NVM interface 218 may store the user data and logical address together to maintain their association. This way, even if a separate data structure maintaining the physical-to-logical mapping in NVM 220 (e.g., context information stored in NVM 220) becomes outdated, NVM interface 218 may still determine the proper mapping at power-up or reboot of electronic device 200, for example.

Figure 3:
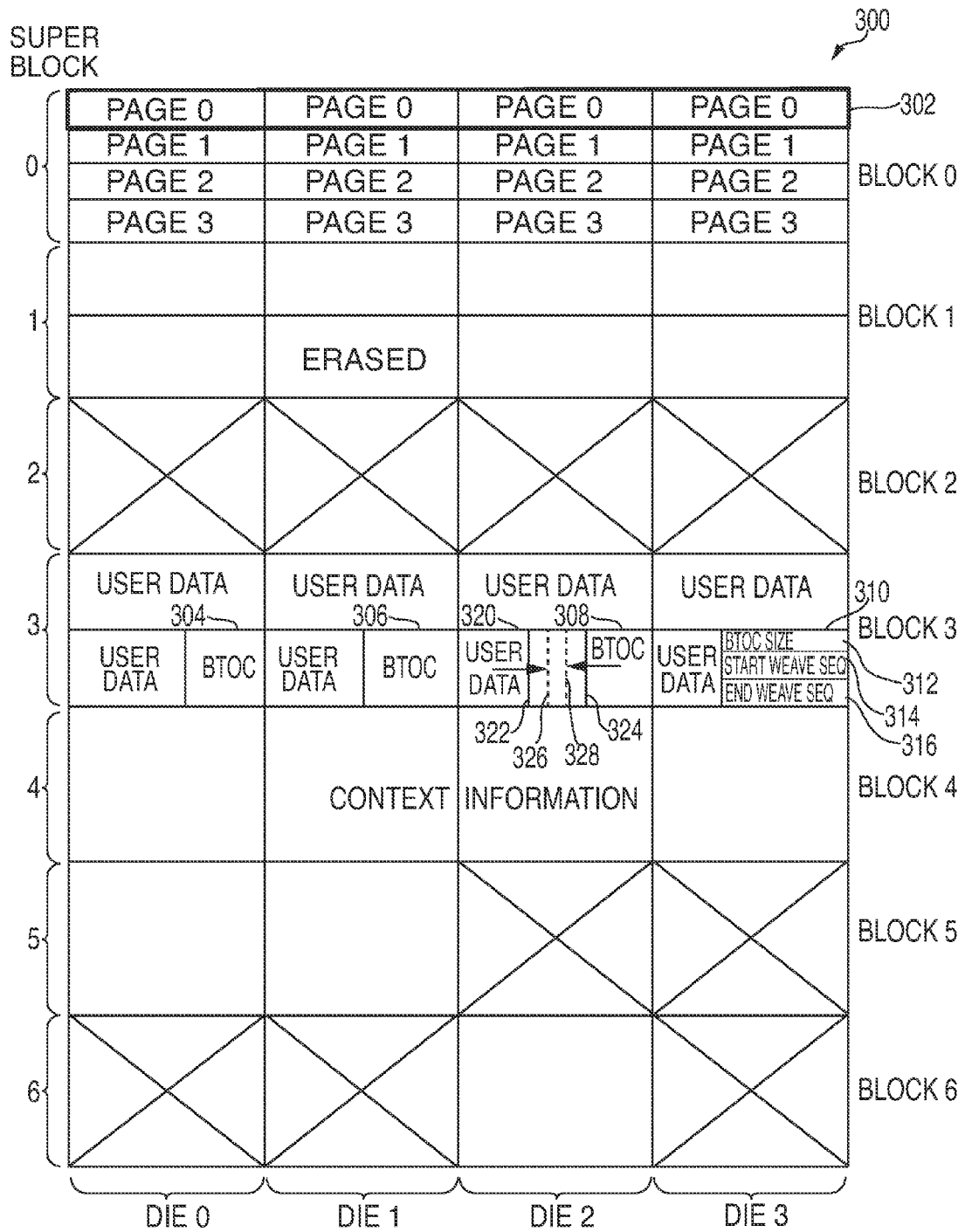
FIG. 3 is a functional view of a non-volatile memory in accordance with various embodiments of the invention.

As discussed above, a NVM (e.g., NVM 120 of FIG. 1 or NVM 220 of FIG. 2) can be organized into dies, blocks, pages, super blocks, and the like. For example, FIG. 3 shows a functional layout of NVM 300. NVM 300 can be the same as or similar to NVM 120 (FIG. 1) or NVM 220 (FIG. 2). FIG. 3 is merely meant to illustrate the organizational layout of NVM 300 and does not indicate an actual, physical layout of the non-volatile memory. For instance, although die 0 is illustrated as being next to die 1 in FIG. 3, this is merely for illustrating the functional relationship of these dies, and in the actual, physical layout of NVM 300, these dies may or may not be located near one another.

Moreover, although a certain number of dies, blocks, and pages are shown in FIG. 3, this is merely for the purpose of illustration and one skilled in the art could appreciate that NVM 300 could include any suitable number of dies, blocks, and pages. As one illustration, NVM 300 can include 2, 4, 8, or 16 dies. As another illustration, each die of NVM 300 can include 4096 blocks, each block may include 64, 128, or 192 pages based on whether the block is an SLC block, 2-bit MLC block, or 3-bit MLC block.

As illustrated by FIG. 3, NVM 300 can include one or more dies (e.g., integrated circuits), such as die 0, die 1, die 2, and die 3. Each die of NVM 300 may be organized into one or more "blocks". For example, dies 0-3 is illustrated as each being organized into blocks 0-3.

Each block of the dies may be organized into one or more pages. For example, block 0 of each of dies 0-3 is illustrated as being organized into pages 0-3. Each page of NVM 300 can include any suitable information. For example, the pages can include user data, metadata, or both.

The pages of NVM 300 can have any suitable size. For example, a page may be 8 KiB or 16 KiB. In conventional systems, each page is used to store a single logical address (e.g., a single LBA). However, when the system only needs a portion of a page, the system must nonetheless access an entire page. For example, during a read operation, the system may need to read an entire page and discard the unwanted user data. As another example, during a program operation, the system may need to read an entire page, discard the unwanted user data, modify the rest of the page with the new data, and re-program the updated portion. Thus, the amount of extra data that must be processed can decrease overall performance and increase write amplification. Moreover, the negative effects are amplified because there may be a large number of small access operations (e.g., 4 KiB-sized access operations) in a typical system.

Accordingly, the system can include multiple logical addresses in a single page, thereby improving system performance and write amplification. For example, each LBA can be set to 4 KiB. If each page of NVM 300 has a size of 8 KiB, each page can be capable of storing two LBAs.

Likewise, if each page has a size of 16 KiB, each page can be capable of storing four LBAs. Persons skilled in the art will appreciate that the system can also program logical addresses to different sizes. For example, a LBA can be set to even smaller values (e.g., 3 KiB, 2 KiB, or 1 KiB), which can allow each page to store additional LBAs.

Figure 4:
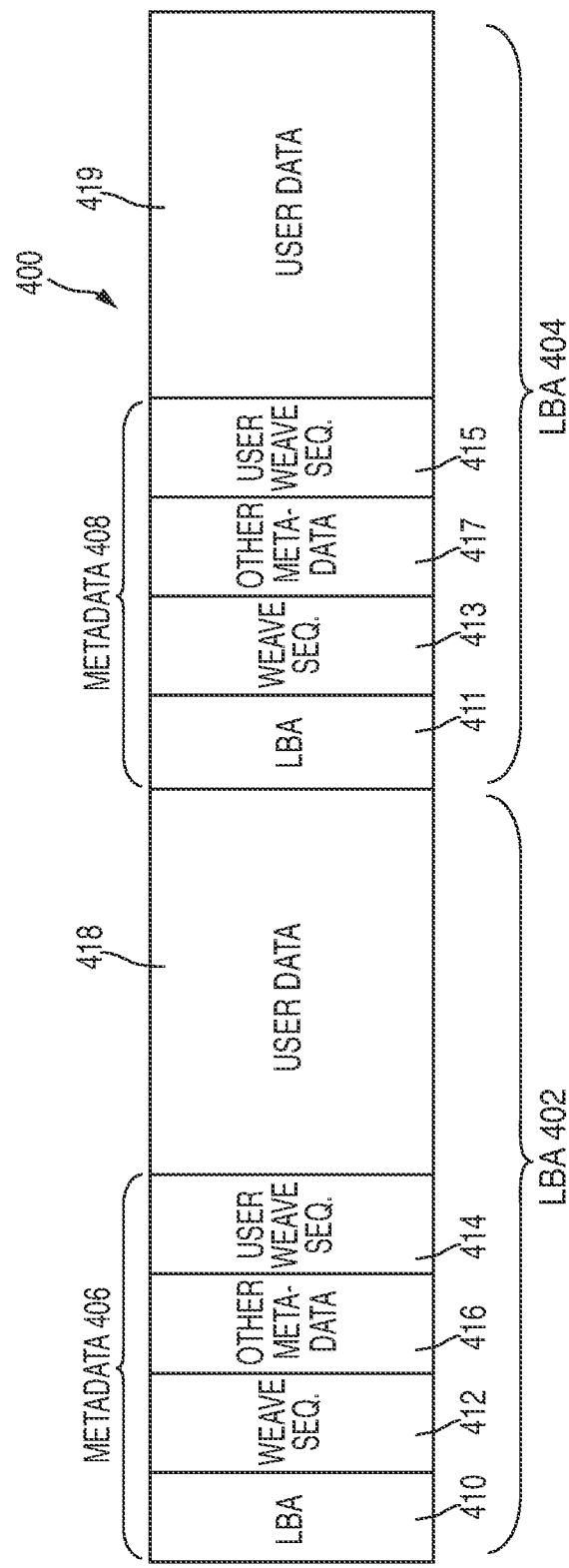
FIG. 4 is a graphical view of a page in a non-volatile memory in accordance with various embodiments of the invention.

Referring now to FIG. 4, a more detailed view of a page 400 is shown. Page 400 can be the same as or similar to one of pages 0-3 of FIG. 3. In particular, page 400 may be an 8 KiB page, and it may be capable of storing two LBAs (e.g., LBAs 402 and 404).

As shown, LBAs 402 and 404 can include metadata 406 and 408, respectively. Metadata 406 and 408 can each include a LBA (e.g., LBAs 410 and 411), a weave sequence (e.g., weave sequences 412 and 413), a user weave sequence (e.g., user weave sequences 414 and 415), and other metadata (e.g., other metadata 416 and 417). Each section of metadata 406 and 408 can be allocated a different size. For example, the LBA, the weave sequence, the user weave sequence, and other metadata can be allocated four bytes, six bytes, four bytes, and two bytes, respectively.

LBAs 410 and 411 can represent the logical addresses of user data 418 and 419, respectively. In addition, user weave sequences 414 and 415 can indicate when data was last programmed to a LBA (e.g., LBA 410 or 411) by an application and/or operating system. Weave sequences 412 and 413 can indicate when data was last programmed to a LBA (e.g., LBA 410 or 411) by any source (e.g., by a GC process or by an application or operating system).

Other metadata 416 and 417 can include any other suitable information such as, for example, one or more flags, page type, version, length, and/or ECC data. The page type and version can allow the system to easily identify the current version of a page. Moreover, this information allows system modifications to be easily made. For example, if a new page type is needed, the page type can be easily incremented to indicate the new page type. The length can indicate the amount of content that is included in a page. Moreover, as discussed previously, ECC data can be used for error detection and/or correction of the stored user data.

User data 418 and 419 can correspond to user data stored in page 400. For an 8 KiB page, user data 418 and 419 can each be allocated 4096 bytes.

Referring back to FIG. 3, each block or super block of NVM 300 can store a block table-of-contents ("TOC"). As shown in FIG. 3, for instance, block 3 of each of dies 0-3 can include block TOCs 304-310, respectively. In some embodiments, the block TOC can be stored at the end of an associated block. Persons skilled in the art will appreciate that other blocks in NVM 300 may also include block TOCs. However, only block TOCs 304-310 are shown for the sake of simplicity.

A block TOC can be a journal that includes information mapping the data pages of a block or super block to corresponding logical addresses (e.g., LBAs or logical page numbers). By scanning a block TOC, The NVM interface can obtain logical-to-physical mappings for the block or super block without having to scan the entire block.

In addition, as shown in FIG. 3, a block TOC can include a block TOC size (e.g., BTOC size 312), a start weave sequence (e.g., start weave sequence 314), and an end weave sequence (e.g., end weave sequence 316). The start weave sequence can indicate when user data was first programmed to a block, and can be programmed in a first page of the block TOC. Likewise, the end weave sequence can indicate when user data was last programmed to a block, and can be programmed in a last page of the block TOC. Persons skilled in the art will appreciate that a block TOC can include any other suitable data such as, for example, a page type. For the sake of simplicity, however, block TOC 310 is shown to include only three entries.

As discussed in connection with FIG. 4, by storing multiple logical addresses in a single page, the system can generate logical-to-physical mappings at a finer granularity than in conventional configurations. This can sometimes produce a large amount of mapping information. However, because many consecutively issued write commands are logically sequential, the system can take advantage of this in capturing the logical-to-physical mappings in a block TOC. In particular, a NVM interface (e.g., NVM interface 118 of FIG. 1 or NVM interface 218 of FIG. 2) can encode a block TOC.

For example, the NVM interface can generate the block TOC by run-length encoding the contents of the block TOC. That is, if a series of logically sequential addresses are programmed consecutively, the encoded block TOC can represent the sequential logical addresses as a single entry. In addition to the representation of the logical addresses, each entry of the block TOC can be associated with a count of the logical addresses (e.g., the range of the logical addresses) and/or any other additional information that needs to be retained.

In contrast to unencoded block TOCs, which have large fixed sizes of multiple pages (e.g., 8 pages), encoded block TOCs can have smaller default sizes (e.g., a single page). Moreover, an encoded block TOC can be dynamically-sized. That is, as user data associated with one or more write commands are being programmed to a block, the size of the block TOC can be recalculated concurrently and increased only if necessary. Thus, as the data pages of a block are being filled with user data, the programmed data pages and the block TOC can run towards each other.

For example, as illustrated in FIG. 3, data pages 320 can have current boundary 322, and block TOC 308 can have current boundary 324. As new user data is being programmed to the block, current boundary 322 of data pages 320 can expand to new boundary 326. Likewise, the size of block TOC 308 may also increase (e.g., increase by one page) in order to capture information associated with the new user data. For example, current boundary 324 of block TOC 308 can expand to new boundary 328.

Eventually, the end boundary of the data pages (e.g., boundary 326) and the start boundary of the block TOC (e.g., boundary 328) may meet or cross over. Thus, upon detecting that these boundaries are about to meet (e.g., the boundaries are within a pre-determined number of pages of each other), the NVM interface can determine that the block is full, and select a new block for programming user data.

Consequently, the rate at which a block TOC increases in size can be dependent on one or more characteristics of the NVM and issued write commands. For example, the one or more characteristics can include the size of one or more write commands, the order (e.g., sequentiality) of logical addresses of the one or more write commands, the compressibility of the user data associated with the one or more write commands, the geometry of a particular block, and/or any combination thereof. For instance, a single block TOC entry may be able to capture a single large write command or multiple small sequential write commands. In contrast, multiple block TOC entries may be needed to capture multiple small random write commands. As a result, the block TOC may have a relatively large size only in a worst-case scenario (e.g., many small random write commands).

Because the block TOCs of NVM 300 are dynamically-sized, each block TOC can include a block TOC size (e.g., block TOC size 310). The block TOC size can be stored as a portion of the metadata of a block TOC (e.g., as a portion of the last page of the block TOC). Thus, during a boot-up process, the NVM interface can read the last page of the block TOC to obtain the block TOC size. The block TOC size can allow the system (e.g., translation layer 214 of FIG. 2) to easily identify the contents of the block TOC during a replay process after boot-up or a garbage collection process. The replay process will be discussed in more detail below.

NVM 300 can include one or more super blocks that include one block from each die that has the same position or "block number" in the die. For example, super block 0 of NVM 300 can include block 0 of each of dies 0-3. Similarly, super block 1 of NVM 300 can include block 1 of each of dies 0-3, super block 2 of NVM 300 can include block 2 of each of dies 0-3, and so forth.

Super blocks can be formed by virtually linking or "striping" together one or more blocks. Blocks need not be in the same row of each die to be virtually linked as a super block. In fact, blocks may be chosen randomly from two or more dies to form a super block. Super blocks provide operational parallelism, thereby enabling programming, reading, and erase operations to be performed on blocks located in different dies in parallel.

In addition, pages from two or more dies may be virtually linked together to form super pages or "stripes". For instance, stripe 302 can include page 0 from block 0 of each of dies 0-3.

As discussed previously, a VFL (e.g., VFL 222 of FIG. 2) may keep track of super blocks or stripes in a NVM. Moreover, when a particular block of NVM 300 is determined to be a bad block (e.g., one or more programming failures have been detected in the block), the VFL can dynamically adjust the size of the associated super block. Thus, as shown in FIG. 3, each of super blocks 0-6 can be dynamically-sized. For example, super blocks 0, 1, 3, and 4 can have four functional ("good") blocks, and can have maximum sizes. In contrast, super block 5 has only two functional blocks, and super block 6 has only one functional block. These super blocks have reduced sizes in comparison to super blocks 0, 1, 3, and 4. Furthermore, super block 2 has all bad blocks.

The mapping of individual super blocks in a translation layer (e.g., translation layer 214 of FIG. 2) may also differ depending on the size of each super block. For example, turning now to FIG. 5, an illustrative mapping 500 of a non-volatile memory from the perspective of a translation layer is shown. As shown, mapping 500 can be associated with NVM 300 (FIG. 3). Consequently, entries 502-514 of mapping 500 can be associated with super blocks 0-6.

In order to obtain the available range of each of super blocks 0-6, the translation layer may need to obtain both the beginning and end addresses of each super block. For example, the translation layer can set the beginning address of a super block to be the base address of the super block, which is the super block number multiplied by the size of the super block.

Figure 5:
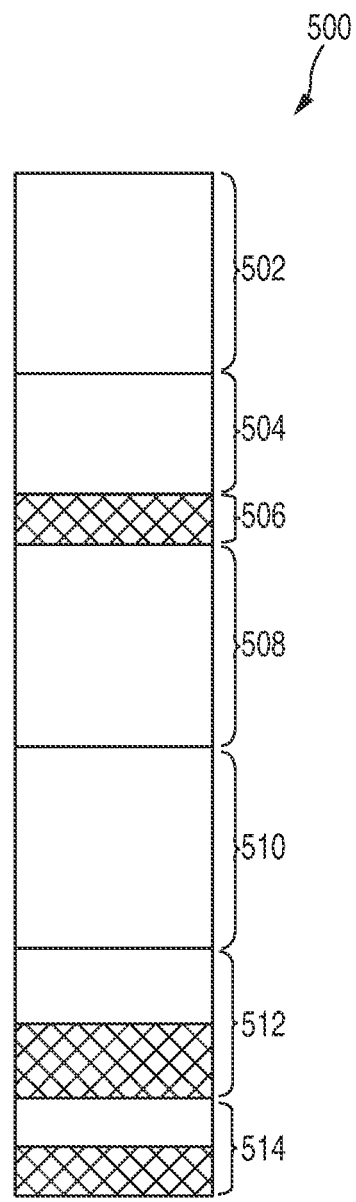
FIG. 5 is an illustrative mapping of a non-volatile memory from the perspective of a translation layer in accordance with various embodiments of the invention.

In order to obtain the end address of a super block, the translation layer can query the VFL (e.g., VFL 222 of FIG. 2) to obtain the size of the super block. This query can be performed during the handshake process of device boot-up. For example, as shown in FIG. 5, the size of each of entries 502-514 can correspond to the size of an associated super block. That is, due to the dynamically-sized super blocks, each entry of mapping 500 can also be dynamically sized.

For instance, because super block 0 (FIG. 3) has a maximum size, associated entry 502 may also be allocated a large size. By comparison, super block 5 has a reduced size, which also shrinks the size of associated entry 512. In addition, the translation layer can mark each super block having functional blocks as allocatable super blocks (e.g., super blocks 0, 1, and 3-6 of FIG. 3).

In some embodiments, because super block 2 (FIG. 3) includes no functional blocks, the size of associated entry 506 may be significantly reduced. In addition, the translation layer can mark super block 2 as dead, and will not allocate super block 2 for writes or reads. In other embodiments, the entry associated with a completely bad super block may not even be included in mapping 500.

Referring back to FIG. 3, NVM 300 can include one or more blocks (e.g., super block 4) that are together designated as a context information block. As used herein, "context information" can refer to information associated with the state of a NVM at a particular point in time. Context information can include any suitable information such as, for example, self-identifying information, statistics information, one or more weave sequences (e.g., a base or start weave sequence and/or an end weave sequence), logical-to-physical mappings, self-identifying information (e.g., page type, version, and length), and/or any combination thereof.

The self-identifying information can provide both backward and forward system compatibility, and allow the system to function under a variety of formats. That is, despite losing some abilities in certain instances (e.g., while the system is operating under an older version), the system does not have to reconfigure the NVM to change formats in order to adopt new versions.

For example, on system boot-up, a NVM interface (e.g., NVM interface 118 of FIG. 1 or NVM interface 218 of FIG. 2) can obtain the page type and/or version from the context information and/or one or more block TOCs, and handle other metadata in the NVM in a manner consistent with the page type and/or version. In some embodiments, the system can apply default policies if it encounters a page type or version that it does not recognize. For example, if a NVM interface that is expecting erase counters loads an old version that does not include erase counters, the NVM interface can substitute default values (e.g., zeroes) for the missing erase counters. Although this may result in improper wear leveling, the device can still be functional on boot-up. Likewise, if a NVM interface that is not expecting erase counters loads a new version that includes erase counters, the system can ignore the erase counters. In other embodiments, the NVM interface can execute an adapter program that is capable of loading an old version, but allows the system to save data in a new version.

In some embodiments, context information can include logical-to-physical mappings between LBAs (e.g., base LBAs) and virtual block addresses ("VBAs") in a system. A VBA can be equal to the sum of a physical page number and the offset into the page where the data corresponding to the LBA is stored. Some NVMs may include index pages, which can store logical-to-physical mappings. Thus, each time that a write command is executed, the mapping in an index page can be updated. However, for NVMs that do not include index pages, the system may need to perform a periodic save of the context information (e.g., the context differential) in the context information block.

Consequently, upon device reboot, the context information can be loaded from the context information block in order to recover the logical-to-physical mappings when the context information was last stored. After recovering the logical-to-physical mappings, the NVM interface can save the mappings in a tree (e.g., tree 116 of FIG. 1) in volatile memory (e.g., memory 114 of FIG. 1).

In some cases, particularly during unclean device shutdowns, more recent mapping updates may not be captured by the context information. Thus, in order to obtain more recent mapping updates, a NVM interface (e.g., NVM interface 118 of FIG. 1 or NVM interface 218 of FIG. 2) can replay across one or more super blocks of the NVM. Because some super blocks may include old user data while others may store new user data, a NVM interface (e.g., NVM interface 118 of FIG. 1 or NVM interface 218 of FIG. 2) can use one or more parameters of the context information to determine whether to replay across one or more super blocks after loading the context information.

In some embodiments, the NVM interface can use a weave sequence stored in the context information and an end weave sequence associated with each super block of the NVM to determine whether to replay across one or more super blocks. In some cases, the end weave sequence associated with each super block of the NVM can be stored in a block TOC (e.g., block TOC 310) of the super block.

In particular, after reboot, the NVM interface can obtain the end weave sequence of a super block from a block TOC (e.g. by reading the last page of the block TOC). If the end weave sequence associated with a super block is not greater than the weave sequence of the context information, the NVM interface can ignore the super block. This can be an indication that the user data in the super block is older than the context information. Thus, the NVM interface does not have to analyze the super block to determine whether logical-to-physical mappings have been updated in the super block.

If, however, the end weave sequence is greater (e.g., newer) than the weave sequence of the context information, the NVM interface may assume that the super block is either partially programmed with new data or has been erased. The NVM interface can therefore replay across the super block.

As shown in FIG. 3, for instance, if the NVM interface determines that the end weave sequence of super block 3 is greater than the weave sequence of the context information, In replaying across a super block, for each page of the super block, the NVM interface can compare the one or more weave sequences of the page (e.g., weave sequences 412 and 413 of FIG. 4) with the weave sequence of the context information. Based on this comparison, the NVM interface can determine whether user data stored in the page is older than the context information, and whether to replay across the page. If the NVM interface determines to replay across the page, the NVM interface can obtain mapping updates from the page. Subsequently, the NVM interface can modify a tree (e.g., tree 116 of FIG. 1) stored in volatile memory with the updates obtained from the page.

If the NVM interface determines that all pages of a super block include older user data (e.g., the weave sequences of all of the pages of the super block are not greater than the weave sequence of the context information), the NVM interface can mark the super block for deletion. At a later time, the NVM interface can perform garbage collection on the super block.

In some cases, a super block may not include a weave sequence. This may indicate that the super block is at least partially erased. In such instances, the NVM interface can infer that the end weave sequence is infinite, and replay across the super block. During the replay, the NVM interface can ignore any pages with user data that are older than the context information.

In some embodiments, instead of obtaining logical-to-physical mappings by paging index pages in the NVM, the system may need to rely on the tree for the mappings. Thus, when the tree becomes saturated (e.g., the amount of memory available for the tree is below a pre-determined threshold), a tree flattening algorithm can be used to flatten a portion of the tree in order to free up tree memory. For example, the system can find adjacent data fragments in the NVM, and reprogram the data fragments in the NVM. In this way, associated entries in the tree can be combined into a single entry or node, and the tree memory can be freed up.

In some embodiments, the NVM interface can provide for multiple write paths. In conventional systems, small write commands are directly dispatched to the NVM, and the system may wait for each write command to complete before servicing additional commands. This reduces system bandwidth and increases the programming latency.

However, by buffering small write commands, the system can achieve die-level parallelism and improve programming efficiency (e.g., decrease programming latency). In particular, the NVM interface can buffer small write commands in a write buffer stored in memory (e.g., memory 114 of FIG. 1). Heuristics can be used to determine whether to buffer one or more write commands. Once the write buffer is full or a clearance point has been reached, the NVM interface can program the buffered write commands to the NVM at the same time. In some embodiments, encryption (e.g., Advanced Encryption Standard ("AES")) can be performed on the write commands while the write commands are being buffered.

In some embodiments, the system may provide multiple write streams. Each write stream can be assigned to different blocks and/or super blocks. For example, there can be a dynamic write stream and a static write stream. In some cases, various parameters (e.g., weave sequences) can be used to determine whether user data is dynamic or static. In addition, during a replay process (e.g., after a reboot), the system can follow the chronological order (e.g., stripe-sequential order) of the weave sequences of programmed pages in order to maintain time-order coherency. For example, the system can move in the order that the data was programmed (e.g., across a die, then down the pages of the die). This allows the system to obtain the most current versions of logical addresses. Persons skilled in the art will appreciate that the system can provide any suitable number of write streams. The number of write streams that are provided can be based on a number of factors such as, for example, system capacity.

Figure 6:
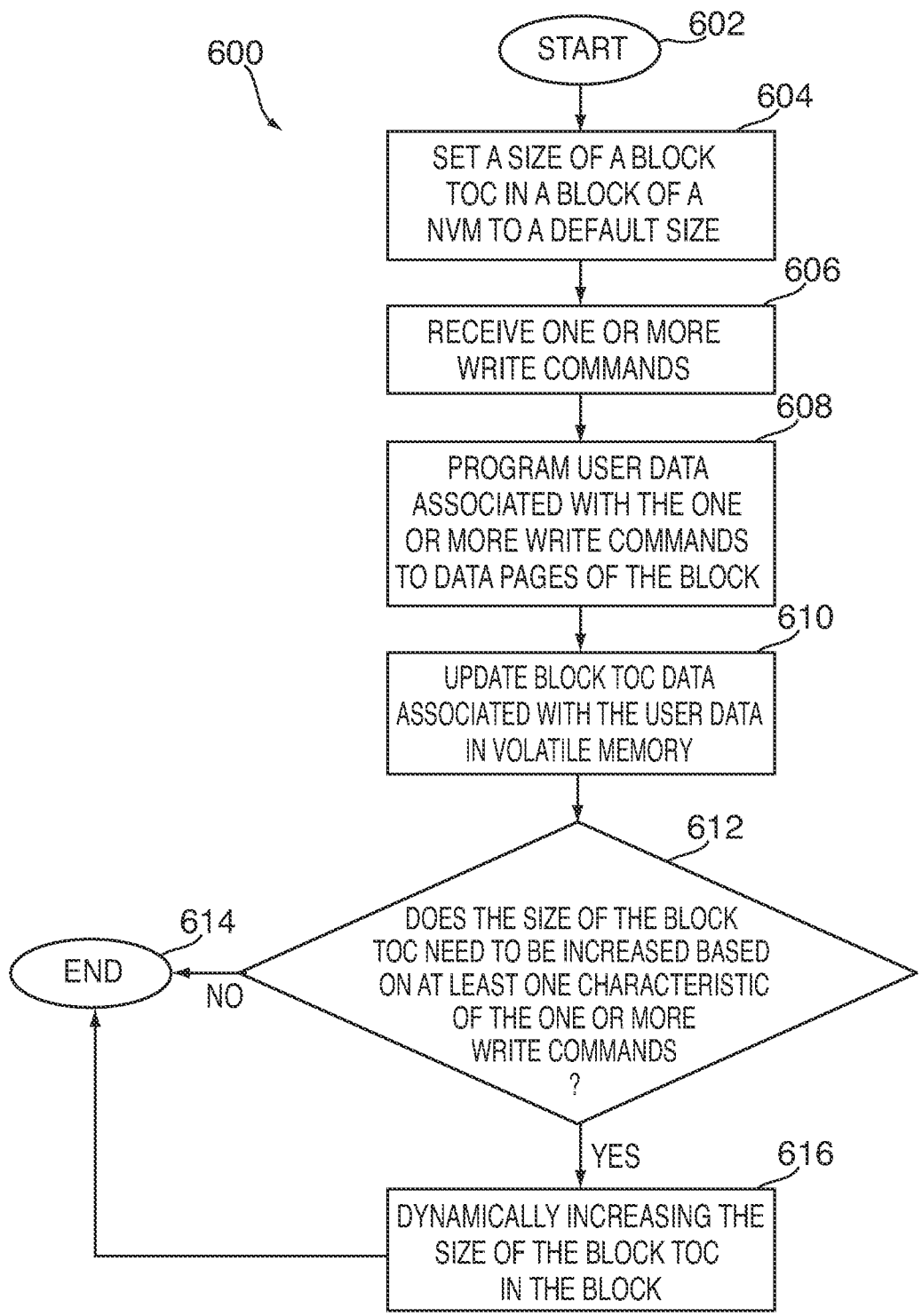
FIG. 6 is a flowchart of an illustrative process for dynamically increasing the size of a block table-of-contents in a non-volatile memory in accordance with various embodiments of the invention.
Figure 7:
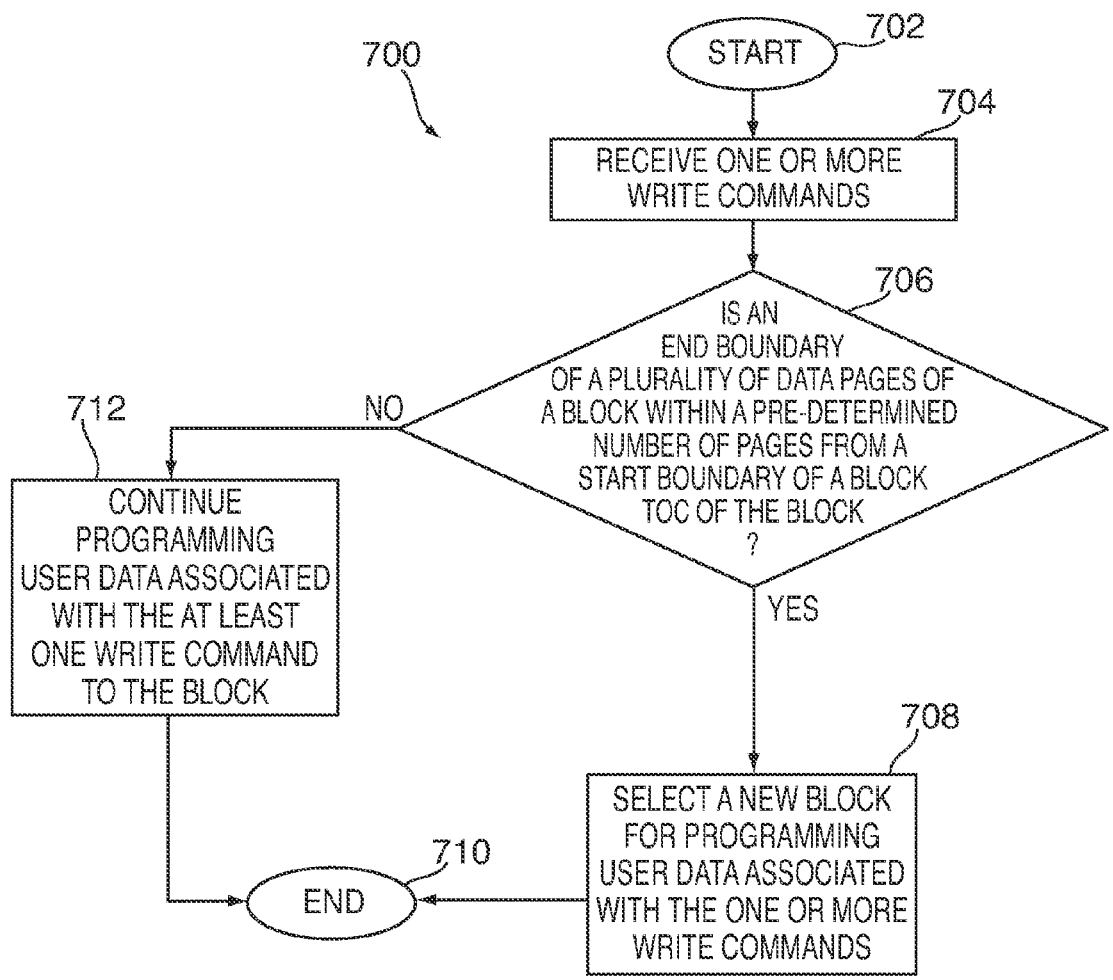
FIG. 7 is a flowchart of an illustrative process for determining whether a block is full in a non-volatile memory in accordance with various embodiments of the invention.
Figure 8:
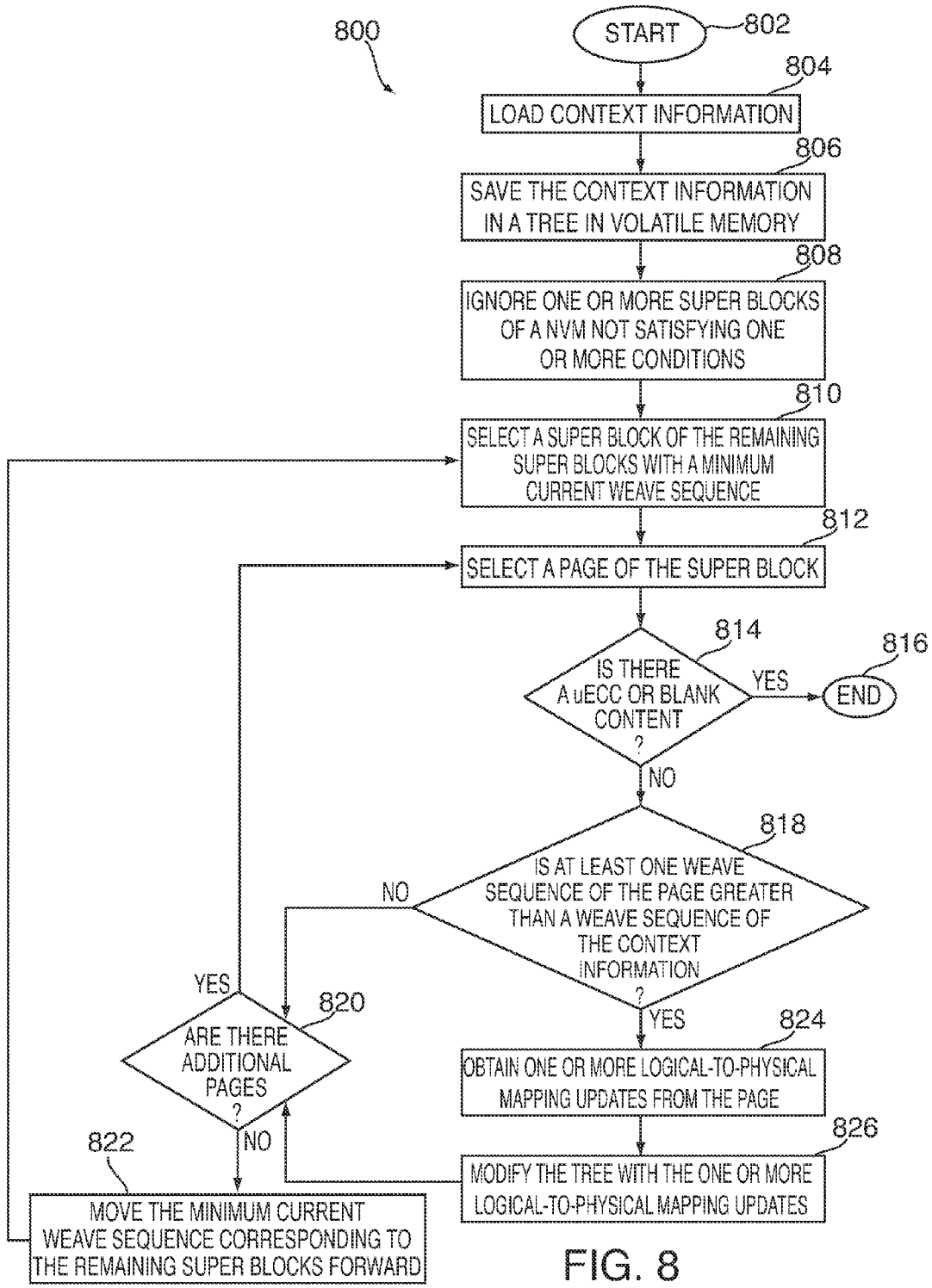
FIG. 8 is a flowchart of an illustrative process for replaying one or more super blocks of the non-volatile memory after system boot-up in accordance with various embodiments of the invention.

Referring now to FIGS. 6-8, flowcharts of illustrative processes are shown in accordance with various embodiments of the invention. These processes may be executed by one or more components in a system (e.g., electronic device 100 of FIG. 1 or electronic device 200 of FIG. 2). For example, at least some of the steps in the processes of FIGS. 6-8 may be performed by NVM interface (e.g., NVM interface 118 of FIG. 1 or NVM interface 218 of FIG. 2). Persons skilled in the art will appreciate that one or more of the steps may be performed by control circuitry (e.g., SoC control circuitry 112 of FIG. 1).

Turning first to FIG. 6, process 600 is shown for dynamically increasing the size of a block TOC in a NVM (e.g., NVM 120 of FIG. 1, NVM 220 of FIG. 2, or NVM 300 of FIG. 3). Process 600 may begin at step 602, and at step 604, the NVM interface can set a size of a block TOC (e.g., one of block TOCs 304-310 of FIG. 3) in a block of a NVM to a default size (e.g., one page). Thus, the block TOC may initially be assigned a small footprint in the block.

Continuing to step 606, the NVM interface can receive one or more write commands. Then, at step 608, the NVM interface can program user data associated with the one or more write commands to data pages (e.g., data pages 320 of FIG. 3) of the block. Process 600 may then move to step 610.

At step 610, the NVM interface can update block TOC data associated with the user data in volatile memory (e.g., memory 114 of FIG. 1). Block TOC data can include any suitable data such as, for example, information mapping the data pages of a block to corresponding logical addresses, a start weave sequence, an end weave sequence, a size of the block TOC, and/or self-identifying information (e.g., page type and/or version). Then, after all of the user data has been programmed to the block, the NVM interface can program the block TOC data to the block TOC. For example, the NVM interface can program a start weave sequence (e.g., start weave sequence 314 of FIG. 3) to a first page of the block TOC. As another example, the NVM interface can program an end weave sequence (e.g., end weave sequence 316 of FIG. 3) to a last page of the block TOC. As yet another example, the NVM interface can program a size of the block TOC (e.g., block TOC size 310 of FIG. 3) to a last page of the block TOC. In some cases, the NVM interface can also program self-identifying information such as a page type and/or a version to the block TOC.

At step 612, the NVM interface can determine whether to increase the size of the block TOC based on at least one characteristic of the one or more write commands. For example, the at least one characteristic can include the size of the one or more write commands, the order (e.g., sequentiality) of logical addresses associated with the one or more write commands, the compressibility of the user data, and/or any combination thereof.

If the NVM interface determines not to increase the size of the block TOC based on at least one characteristic of the one or more write commands, process 600 may end at step 614. If, at step 612, the NVM interface determines to increase the size of the block TOC based on at least one characteristic of the one or more write commands, process 600 may move to step 616. For example, the NVM interface may have determined that as the block TOC is being filled, the contents of the block TOC needs to expand to another page (e.g., from boundary 324 to boundary 328 of FIG. 3).

At step 616, the NVM interface can dynamically increase the size of the block TOC in the block. For example, the NVM interface can increase the size of the block TOC by one page. This consequently decreases the total size of data pages of the block by a corresponding amount (e.g., makes one less page available for programming user data). Thus, although block TOC may generally have a size of one page, it can grow to have a size of 4 or 8 pages, for example. Process 600 may then end at step 614.

Turning now to FIG. 7, process 700 is shown for determining whether a block is full in a NVM (e.g., NVM 120 of FIG. 1, NVM 220 of FIG. 2, or NVM 300 of FIG. 3). Process 700 may begin at step 702, and at step 704, the NVM interface can receive one or more write commands. Then, at step 706, the NVM interface can determine whether an end boundary of a plurality of data pages of a block (e.g., boundary 326 of FIG. 3) is within a pre-determined number of pages from a start boundary of a block TOC of the block (e.g., boundary 328 of FIG. 3). If, at step 706, the NVM interface determines that the end boundary of the plurality of data pages is within the pre-determined number of pages from the start boundary of the block TOC, process 700 may move to step 708. That is, the NVM interface may have determined that the block is full.

At step 708, the NVM interface can select a new block for programming user data associated with the one or more write commands. Process 700 may then end at step 710.

Referring back to step 706, if the NVM interface instead determines that the end boundary of the plurality of data pages is not within the pre-determined number of pages from the start boundary of the block TOC, process 700 may then move to step 712.

At step 712, the NVM interface can continue to program user data associated with the one or more write commands to the block. Process may then end at step 710.

Turning now to FIG. 8, process 800 is shown for replaying one or more super blocks of a NVM (e.g., NVM 120 of FIG. 1, NVM 220 of FIG. 2, or NVM 300 of FIG. 3) after system boot-up. Process 800 may begin at step 802, and at step 804, the NVM interface can load context information stored in a super block of the NVM (e.g., super block 4 of FIG. 4) upon device boot-up.

At step 806, the NVM interface can save the context information in a tree (e.g., tree 116 of FIG. 1) stored in volatile memory (e.g., memory 114 of FIG. 1).

Continuing to step 808, the NVM interface can ignore one or more super blocks of a NVM that do not satisfy one or more conditions. For example, the NVM interface can ignore all super blocks having an end weave sequence (e.g., a maximum weave sequence) that is less than or equal to a weave sequence of the context information. In particular, the NVM interface can examine a block TOC (e.g., block TOC 310) of the super block. In some cases, this comparison can result in all super blocks of the NVM being ignored. For instance, after a clean shutdown, there may be no super blocks in the NVM with end weave sequences greater than a weave sequence of the context information.

As another example, the NVM interface can ignore all super blocks whose first and last pages are in an erased state. As yet another example, the NVM interface can ignore all super blocks having an uncorrectable error-correcting code ("uECC") in a first page and having no block TOC. The NVM interface can ignore these super blocks using any suitable approach such as, for example, not adding the super blocks to a list of super blocks to examine, removing the super blocks from a list of super blocks to examine, or any other suitable approach.

At step 810, the NVM interface can select a super block of the remaining super blocks with a minimum current weave sequence (e.g., a lowest end weave sequence). Process 800 may then move to step 812, where the NVM interface can determine whether to replay across the super block.

At step 812, the NVM interface can select a page of the super block (e.g., a first unexamined page of the super block). Then, at step 814, the NVM interface can determine if there is a uECC or a pre-determined amount of blank content in the page. If, at step 814, the NVM interface determines that there is uECC or blank content in the page, process 800 may end at step 816.

Referring back to step 814, if the NVM interface instead determines that there is no uECC or blank content in the page, process 800 may move to step 818. At step 818, the NVM interface can determine whether at least one weave sequence of the page (e.g., one of weave sequences 412 or 413) is greater than a weave sequence of the context information. If, at step 818, the NVM interface determines that at least one weave sequence of the page is not greater than the weave sequence of the context information, process 800 may move to step 820. That is, the NVM interface may have determined that the user data in the page is older than the context information, and the NVM interface can therefore ignore the page.

At step 820, the NVM interface can determine whether there are additional pages in the super block. If, at step 820, the NVM interface determines that there are additional pages, process 800 may return to step 812, where another page (e.g., another unexamined page) of the super block can be selected. If the NVM interface instead determines that there are no additional pages in the super block, process 800 can move to step 822.

At step 822, the NVM interface can move the minimum current weave sequence corresponding to the remaining super blocks forward. Process 800 may then return to step 810, where a super block of the remaining super blocks having the next lowest end weave sequence can be selected.

Referring back to step 818, if the NVM interface instead determines that at least one weave sequence of the page is greater than the weave sequence of the context information, process 800 can move to step 824. At step 824, the NVM interface can obtain one or more logical-to-physical mapping updates from the page.

Then, at step 826, the NVM interface can modify the tree with the one or more logical-to-physical mapping updates. Process 800 may then return to step 820, where the NVM interface can determine whether there are additional pages in the super block.

It should be understood that processes 600, 700, and 800 of FIGS. 6-8 are merely illustrative. Any of the steps may be removed, modified, or combined, and any additional steps may be added, without departing from the scope of the invention.

The described embodiments of the invention are presented for the purpose of illustration and not of limitation.

What is claimed is:

1. A system comprising:
a non-volatile memory ("NVM") comprising a plurality of blocks, wherein each block comprises a block table-of-contents ("TOC") and a plurality of data pages;
a bus controller operative to communicate with the NVM; and
control circuitry operative to:
receive at least one write command;
select a first block for programming user data associated with the at least one write command;
determine whether an end boundary of a plurality of data pages of the first block is within a pre-determined number of pages from a start boundary of the block TOC of the first block,
in response to determining that the end boundary of the plurality of data pages is within the pre-determined number of pages from the start boundary of the block TOC, determine the first block is full; and
in response to a determination that the first block is full:
select a second block for programming user data associated with the at least one write command, wherein the second block has been erased and contains no user data; and
program user data associated with the at least one write command in the second block.

2. The system of claim 1, wherein the control circuitry is further operative to program a size of the block TOC to a last page of the block TOC.

3. The system of claim 1, wherein the control circuitry is further operative to program a start weave sequence and end weave sequence to the block TOC.

4. The system of claim 3, wherein the control circuitry is further operative to program the start weave sequence to a first page of the block TOC.

5. The system of claim 3, wherein the control circuitry is further operative to program the end weave sequence to a last page of the block TOC.

6. The system of claim 3, wherein the start weave sequence is associated with when user data was first programmed to the block.

7. The system of claim 3, wherein the end weave sequence is associated with when user data was last programmed to the block.

8. The system of claim 1, wherein the control circuitry is further operative to program at least one of a page type and version to the block TOC.

9. The system of claim 1, wherein response to determining that the end boundary of the plurality of data pages is not within a pre-determined number of pages from the start boundary of the block TOC of the first block, the control circuitry is operative to continue programming user data associated with the at least one write command to the first block.

10. The system of claim 9, wherein the control circuitry is operative to:
increase the size of the block TOC in the first block; and
decrease a total size of the data pages of the block by a corresponding amount.

11. A method for programming user data in a non-volatile memory ("NVM"), the NVM comprising a plurality of blocks, a bus controller, and control circuitry, the method comprising:
communicating with the NVM;
receiving at least one write command;
determining whether an end boundary of a plurality of data pages of a first block is within a pre-determined number of pages from a start boundary of a block table of contents ("TOC") of the first block;
in response to determining that the end boundary of the plurality of data pages is within a pre-determined number of pages from a start boundary of the block TOC, determining that the first block is full; and
in response to a determination that the first block is full:
selecting a second block for programming user data associated with the at least one write command, wherein the second block has been erased and contains no user data; and
programming user data associated with the at least one write command in the second block.

12. The method of claim 11, further comprising programming a size of the block TOC to a last page of the block TOC.

13. The method of claim 11, further comprising programming a start weave sequence and end weave sequence to the block TOC.

14. The method of claim 11, further comprising programming a start weave sequence to a first page of the block TOC.

15. The method of claim 13, further comprising programming the end weave sequence to a last page of the block TOC.

16. The method of claim 13, wherein the start weave sequence is associated with when user data was first programmed to the block.

17. The method of claim 13, wherein the end weave sequence is associated with when user data was last programmed to the block.

18. The method of claim 11, further comprising programming at least one of a page type and version to the block.

19. The method of claim 11, further comprising continuing to program user data associated with the at least one write command to the first block in response to determining that the end boundary of a plurality of pages is not within a pre-determined number of pages from the start boundary of the block TOC.

20. The method of claim 11, wherein the control circuitry increases the size of the block TOC in the first block and decreases a total size of the data pages of the block by a corresponding amount.

* * * * *